United States Patent
Ge et al.

(10) Patent No.: US 12,344,337 B2
(45) Date of Patent: Jul. 1, 2025

(54) ROBOT STATE ESTIMATION METHOD, COMPUTER-READABLE STORAGE MEDIUM, AND LEGGED ROBOT

(71) Applicant: UBTECH ROBOTICS CORP LTD, Shenzhen (CN)

(72) Inventors: Ligang Ge, Shenzhen (CN); Yizhang Liu, Shenzhen (CN); Chunyu Chen, Shenzhen (CN); Zheng Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 207 days.

(21) Appl. No.: 18/144,160

(22) Filed: May 5, 2023

(65) Prior Publication Data

US 2023/0271656 A1 Aug. 31, 2023

Related U.S. Application Data

(63) Continuation of application No. PCT/CN2020/140560, filed on Dec. 29, 2020.

(30) Foreign Application Priority Data

Dec. 24, 2020 (CN) .......................... 202011547547.5

(51) Int. Cl.
*B62D 57/032* (2006.01)
*B25J 9/16* (2006.01)
(Continued)

(52) U.S. Cl.
CPC ............ *B62D 57/032* (2013.01); *B25J 9/161* (2013.01); *B25J 9/1633* (2013.01); *B25J 13/085* (2013.01); *G01M 1/122* (2013.01)

(58) Field of Classification Search
CPC ....... B62D 57/032; B25J 9/161; B25J 9/1633; B25J 13/085; B25J 9/163; G01M 1/122; G01L 5/16
See application file for complete search history.

(56) References Cited

U.S. PATENT DOCUMENTS

| | | | |
|---|---|---|---|
| 2005/0075755 A1* | 4/2005 | Takenaka | B62D 57/032 700/245 |
| 2008/0281469 A1* | 11/2008 | Choi | B62D 57/032 700/253 |
| 2015/0231786 A1* | 8/2015 | Doi | B25J 9/1605 700/245 |

FOREIGN PATENT DOCUMENTS

| | | |
|---|---|---|
| CN | 105511465 A | 4/2016 |
| CN | 111015653 A | 4/2020 |

OTHER PUBLICATIONS

ISR for PCT/CN2020/140560.
(Continued)

*Primary Examiner* — Adam R Mott
*Assistant Examiner* — Sagar K C

(57) ABSTRACT

A robot state estimation method, a computer-readable storage medium, and a legged robot are provided. The method includes: obtaining force information of a left leg of a robot and a right leg of the robot; calculating a ZMP of the robot in a world coordinate system based on the force information of the left leg and the force information of the right leg; and calculating a position of a center of mass (CoM) of the robot based on a preset linear inverted pendulum model. In this manner, a brand-new linear inverted pendulum model is constructed in advance, which uses the ZMP of the robot as a supporting point of the model, thereby fully considering the influence of the change of the position of the ZMP of the robot on the position of the CoM.

20 Claims, 10 Drawing Sheets

(51) Int. Cl.
*B25J 13/08* (2006.01)
*G01M 1/12* (2006.01)

(56) References Cited

OTHER PUBLICATIONS

Written opinions of ISA for PCT/CN2020/140560.
"Virtual Linear Inverted Pendulum Model for Biped Walking During the Double Stance Phase", Feng Shuai et al., "Journal of Tsinghua University", vol. 51, No. 7, pp. 960-965, Jul. 2011.

* cited by examiner

ROBOT STATE ESTIMATION METHOD, COMPUTER-READABLE STORAGE MEDIUM, AND LEGGED ROBOT

CROSS REFERENCE TO RELATED APPLICATIONS

The present disclosure is a continuation-application of International Application PCT/CN2020/140560, with an international filing date of Dec. 29, 2020, which claims foreign priority of Chinese Patent Application No. 202011547547.5, filed on Dec. 24, 2020 in the State Intellectual Property Office of China, the contents of all of which are hereby incorporated by reference.

BACKGROUND

1. Technical Field

The present disclosure relates to robot technology, and particularly to a robot state estimation method, a computer-readable storage medium, and a legged robot.

2. Description of Related Art

During the motion control of a biped robot, it usually needs to estimate the state of the robot, for example, the position of the center of mass (CoM) of the robot so as to control the robot more precisely. However, in the existing technology, the position of the CoM is generally estimated based on the supporting position of the ankle of the robot, which has the estimation results with poor accuracy.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the descriptions of the present disclosure, the terms "first", "second", "third", and the like in the descriptions are only used for distinguishing, and cannot be understood as indicating or implying relative importance.

For the sake of brevity, unless otherwise specified, the robots mentioned in the embodiments of the present disclosure are all legged mobile robots.

Figure 1:
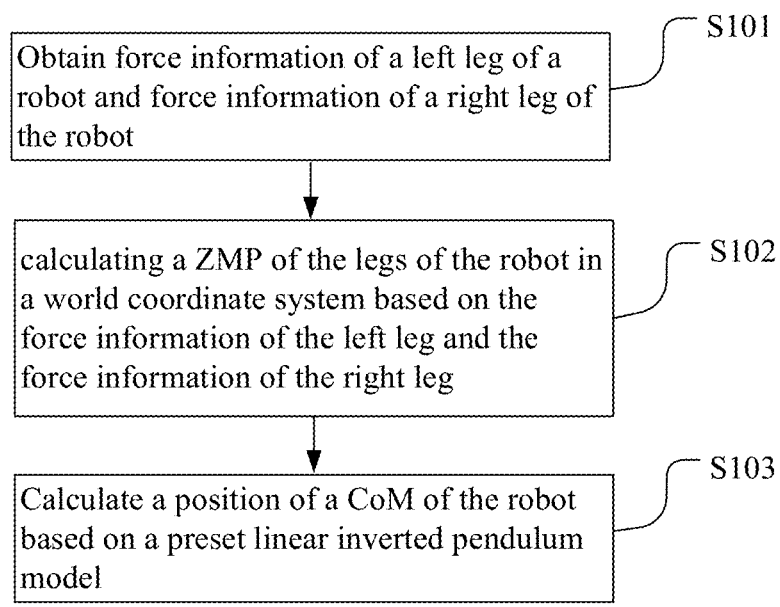
FIG. 1 is a flow chart of a robot state estimation method according to an embodiment of the present disclosure.

FIG. 1 is a flow chart of a robot state estimation method for a legged robot according to an embodiment of the present disclosure. In this embodiment, a state estimation method for estimating the state (e.g., position of CoM, velocity of CoM) of a biped robot is provided. The robot may include a body, and a left leg and a right leg each articularly coupled to the body. Each of the legs has joint(s) each moved by a corresponding motor, and is coupled to a foot of the robot. The state estimation method is a computer-implemented method executable for a processor of the robot. In other embodiments, the method may be implemented through a robot state estimation apparatus shown in FIG. 9, or a robot shown in FIG. 10. As shown in FIG. 1, in this embodiment, the robot state estimation method may include the following steps.

S101: obtaining force information of the left leg of the robot and force information of the right leg of the robot.

Figure 2:
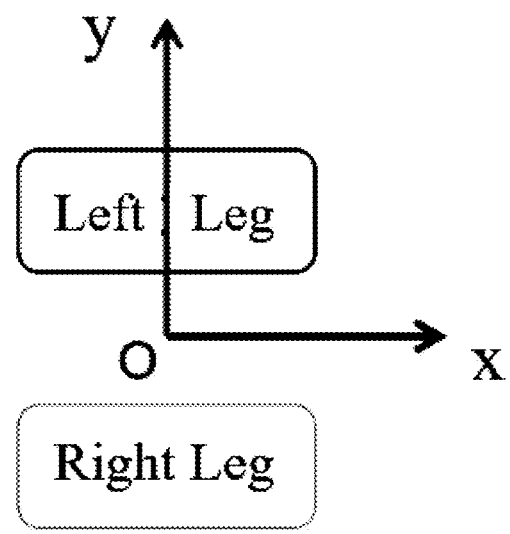
FIG. 2 is a schematic diagram of a world coordinate system according to an embodiment of the present disclosure.

For the convenience of description, the coordinate system used in the embodiments of the present disclosure will be described below first. FIG. 2 is a schematic diagram (top view) of a world coordinate system according to an embodiment of the present disclosure. As shown in FIG. 2, an origin of the world coordinate system is at the midpoint between the two legs (i.e., the left leg and the right leg) of the robot, where the forward direction of its x-axis is the waling direction of the robot, and the forward direction of its y-axis is the left direction of the robot, that is, a direction obtained by rotating the walking direction at 90 degrees counterclockwise, and the forward direction of its z-axis is the vertically upward direction of the robot.

Figure 3:
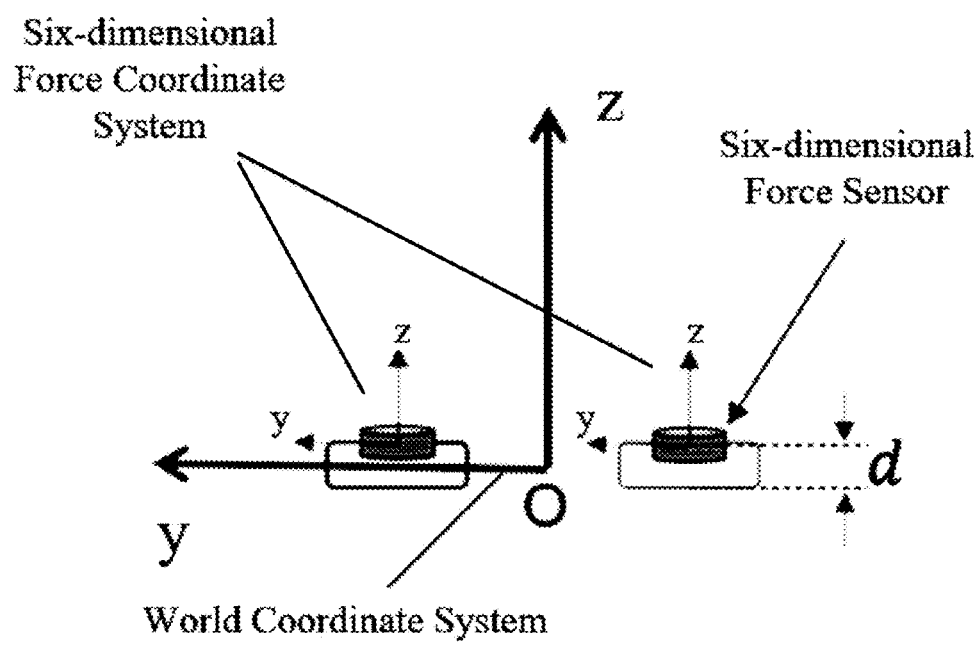
FIG. 3 is a schematic diagram of the comparison between a six-dimensional force coordinate system and the world coordinate system according to an embodiment of the present disclosure.

FIG. 3 is a schematic diagram (rear view) of the comparison between a six-dimensional force coordinate system and the world coordinate system according to an embodiment of the present disclosure. As shown in FIG. 3, an origin of the six-dimensional force coordinate system is at the center of a six-dimensional force sensor, the forward direction of its x-axis, the forward direction of its y-axis, and the forward direction of its z-axis are the forward direction, the left direction, and the upward directions of the six-dimensional force sensor, respectively. For ease of distinction, the two six-dimensional force coordinate systems of the left leg and the right leg are denoted as the six-dimensional force coordinate system of the left leg and the six-dimensional force coordinate system of the right leg, respectively.

In this embodiment, it may install six-dimensional force sensors at the parts where the two feet of robot and the legs are connected. For ease of distinction, the two six-dimensional force sensors of the left leg and the right leg are denoted as the six-dimensional force sensor of the left leg and the six-dimensional force sensor of the right leg, respectively, so as to obtain the force information of the left leg of robot and the force information of the right leg of robot, respectively. In which, the force information of the left leg includes force components and moment components on the three coordinate axes of the six-dimensional force coordinate system of the left leg, and the force information of the right leg includes force components and moment components on the three coordinate axes of the six-dimensional force coordinate system of the right leg.

In this embodiment, the force information of the left leg is denoted as $[F_{lx}, F_{ly}, F_{lz}, T_{lx}, T_{ly}, T_{lz}]$. In which, $F_{lx}$ is a force component of the force information of the left leg on the x-axis of the six-dimensional force coordinate system of the left leg, $F_{ly}$ is a force component of the force information of the left leg on the y-axis of the six-dimensional force coordinate system of the left leg, $F_{lz}$ is a force component of the force information of the left leg on the z-axis of the six-dimensional force coordinate system of the left leg, $T_{lx}$ is a moment component of the force information of the left leg on the x-axis of the six-dimensional force coordinate system of the left leg, $T_{ly}$ is a moment component of the force information of the left leg on the y-axis of the six-dimensional force coordinate system of the left leg, and $T_{lz}$ is a moment component of the force information of the left leg on the z-axis of the six-dimensional force coordinate system of the left leg.

In this embodiment, the force information of the right leg is denoted as $[F_{rx}, F_{ry}, F_{rz}, T_{rx}, T_{ry}, T_{rz}]$. In which, $F_{rx}$ is a force component of the force information of the right leg on the x-axis of the six-dimensional force coordinate system of the right leg, $F_{ry}$ is a force component of the force information of the right leg on the y-axis of the six-dimensional force coordinate system of the right leg, $F_{rz}$ is a force component of the force information of the right leg on the z-axis of the six-dimensional force coordinate system of the right leg, and $T_{rx}$ is a moment component of the force information of the right leg on the x-axis of the six-dimensional force coordinate system of the right leg, $T_{ry}$ is a moment component of the force information of the right leg on the y-axis of the six-dimensional force coordinate system of the right leg, and $T_{rz}$ is a moment component of the force information of the right leg on the z-axis of the six-dimensional force coordinate system of the right leg.

S102: calculating a zero-moment point (ZMP) of the legs of the robot in a world coordinate system based on the force information of the left leg and the force information of the right leg.

Figure 4:
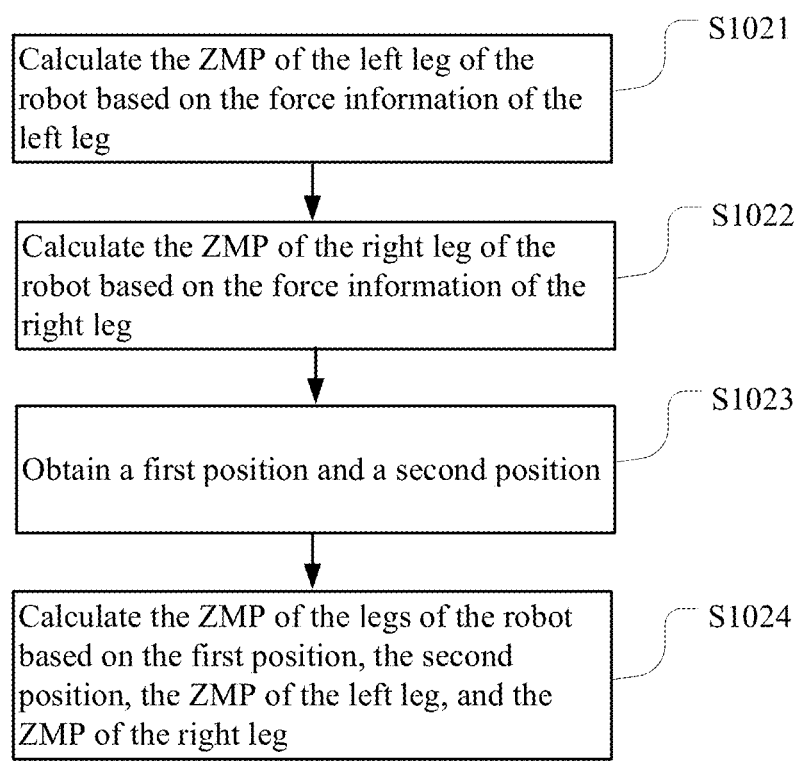
FIG. 4 is a flow chart of calculating a zero-moment point (ZMP) of a robot in the world coordinate system of FIG. 2 based on force information of a left leg and force information of a right leg in the robot state estimation method of FIG. 1.

FIG. 4 is a flow chart of calculating the ZMP of a robot in the world coordinate system of FIG. 2 based on force information of the left leg and force information of the right leg in the robot state estimation method of FIG. 1. As shown in FIG. 4, step S102 may include the following steps.

S1021: calculating the ZMP of the left leg of the robot based on the force information of the left leg.

As an example, the ZMP of the left leg may be calculated using an equation of:

$$p_{lx} = \frac{(-T_{lx} - F_{lx} \cdot d_l)}{F_{lz}};$$

$$p_{ly} = \frac{(-T_{ly} - F_{ly} \cdot d_l)}{F_{lz}}; \text{ and}$$

$$p_l = [p_{lx}, p_{ly}, 0];$$

where, $p_{lx}$ is the coordinate of the ZMP of the left leg on the x-axis of the six-dimensional force coordinate system of the left leg, and $p_{ly}$ is the coordinate of the ZMP of the left leg point on the y-axis of the six-dimensional force coordinate system of the left leg, and $d_l$ is a height between the six-dimensional force sensor of the left leg and a ground, and $p_l$ is the ZMP of the left leg.

S1022: calculating the ZMP of the right leg of the robot based on the force information of the right leg.

As an example, the ZMP of the right leg may be calculated using an equation of:

$$p_{rx} = \frac{(-T_{rx} - F_{rx} \cdot d_r)}{F_{rz}};$$

$$p_{ry} = \frac{(-T_{ry} - F_{ry} \cdot d_r)}{F_{rz}}; \text{ and}$$

$$p_r = [p_{rx}, p_{ry}, 0];$$

where, $p_{rx}$ is the coordinate of the ZMP of the right leg on the x-axis of the six-dimensional force coordinate system of the right leg, and $p_{ry}$ is the coordinate of the ZMP of the right leg on the y-axis of the six-dimensional force coordinate system of the right leg, $d_r$ is a height between the six-dimensional force sensor of the right leg and the ground, and $p_r$ is the ZMP of the right leg.

S1023: obtaining a first position and a second position.

The first position is a position of an origin of the six-dimensional force coordinate system of the left leg of the robot in the world coordinate system which is denoted as [lfoot$_x$,lfoot$_y$,lfoot$_z$], where lfoot$_x$ is the coordinate of the origin of the six-dimensional force coordinate system of the left leg on the x-axis of the world coordinate system, lfoot$_y$ is the coordinate of the origin of the six-dimensional force coordinate system of the left leg on the y-axis of the world coordinate system, and lfoot$_z$ is the coordinate of the origin of the six-dimensional force coordinate system of the left leg on the z-axis of the world coordinate system.

The second position is a position of an origin of the six-dimensional force coordinate system of the right leg of the robot in the world coordinate system which is denoted as [rfoot$_x$,rfoot$_y$,rfoot$_z$], where rfoot$_x$ is the coordinate of the origin of the six-dimensional force coordinate system of the right leg on the x-axis of the world coordinate system, rfoot$_y$ is the coordinate of the origin of the six-dimensional force coordinate system of the right leg on the y-axis of the world coordinate system, and rfoot$_z$ is the coordinate of the origin of the six-dimensional force coordinate system of the right leg on the z-axis of the world coordinate system.

S1024: calculating the ZMP of the legs of the robot based on the first position, the second position, the ZMP of the left leg, and the ZMP of the right leg.

As an example, the ZMP of the legs of the robot may be calculated using an equation of:

$$p_x = \frac{(p_{lx} + lfoot_x) * F_{lz} + (p_{rx} + rfoot_x) * F_{rz}}{F_{lz} + F_{rz}};$$

$$p_y = \frac{(p_{ly} + lfoot_y) * F_{lz} + (p_{ry} + rfoot_y) * F_{rz}}{F_{lz} + F_{rz}}; \text{ and}$$

$$P[3] = [p_x, p_y, 0];$$

where, $p_x$ is the coordinate of the ZMP of the legs of the robot on the x-axis of the world coordinate system, $p_y$ is the coordinate of the ZMP of the legs of the robot on the y-axis of the world coordinate system, and P[3] is the ZMP of the legs of the robot.

It should be noted that the above-mentioned calculation process assumes that the direction of each coordinate axis of the six-dimensional force coordinate system is consistent with that of the world coordinate system by default. Otherwise, it is necessary to perform corresponding rotation transformations on the ZMP of each leg before calculating the ZMP of the legs of the robot, which will not be repeated herein.

S103: calculating a position of a center of mass (COM) of the robot based on a preset linear inverted pendulum model (LIPM), where a supporting point of the linear inverted pendulum model is the ZMP of the legs of the robot.

Figure 5:
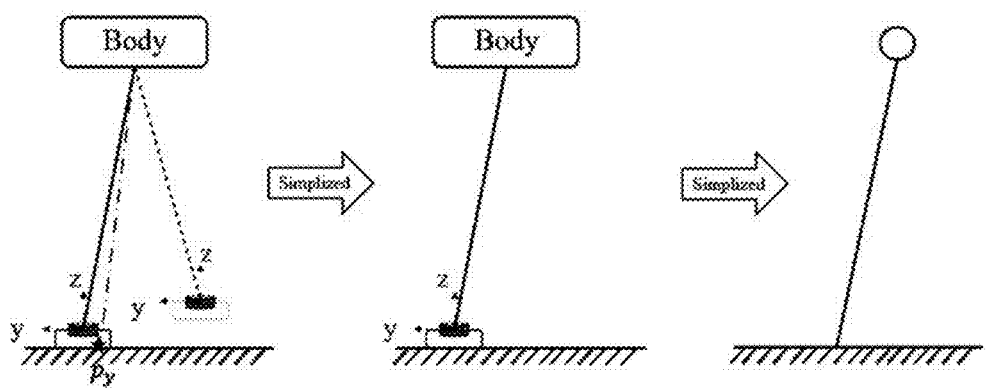
FIG. 5 is a schematic diagram of a linear inverted pendulum model.

Approximation is an effective method to deal with complex systems. In the gait planning of biped robots, simplified models are often used to generate gaits, where the most commonly used simplified model is LIPM. One biped robot can be simplified to one LIPM based on the three assumptions: first, assuming that the overall mass of the robot is concentrated at its CoM; second, assuming that the legs of the robot have no mass; third, assuming that the CoM only moves in the horizontal direction. FIG. 5 is a schematic diagram of a traditional LIPM. As shown in FIG. 5, the left part is a biped model which includes the left leg as the supporting leg and the right leg as the swinging leg, and the right part is a simplified model which is simplified as LIPM by taking the origin of the six-dimensional force coordinate system as the supporting point.

In the LIPM, there are two important physical quantities for describing the motions of the inverted pendulum, namely the position of the CoM and the velocity of the CoM. Whether the current position and velocity of the CoM can be accurately estimated is essential in biped robot balance controls. However, most existing estimation methods do not consider the influence of the change of the position of the ZMP on the estimation of the state of the CoM, and usually estimate directly based on the supporting position of the ankles. Due to the limited variation range of the ZMP (in the supporting area) and the limited deviation of the posture angle of the body (basically within ±5 degrees), this traditional estimation method is approximately accurate, while cannot fully describe the current state of the robot.

Figure 6:
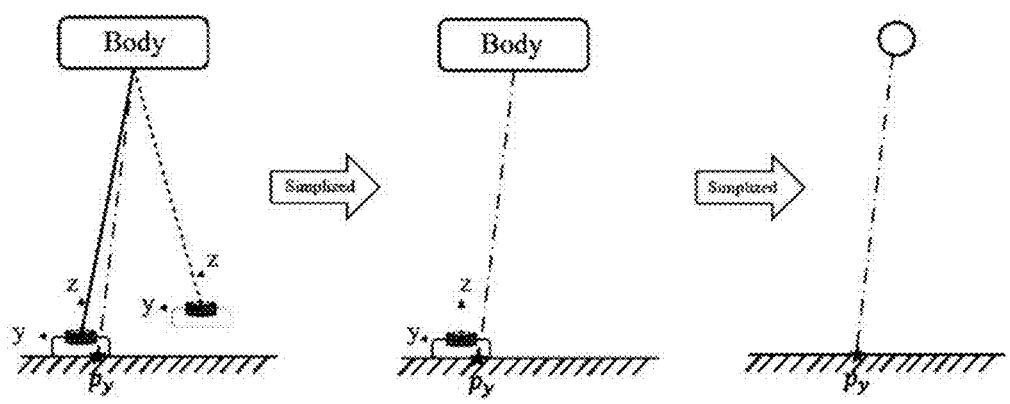
FIG. 6 is a schematic diagram of a linear inverted pendulum model taking the ZMP of the legs of the robot as a supporting point according to an embodiment of the present disclosure.
Figure 7:
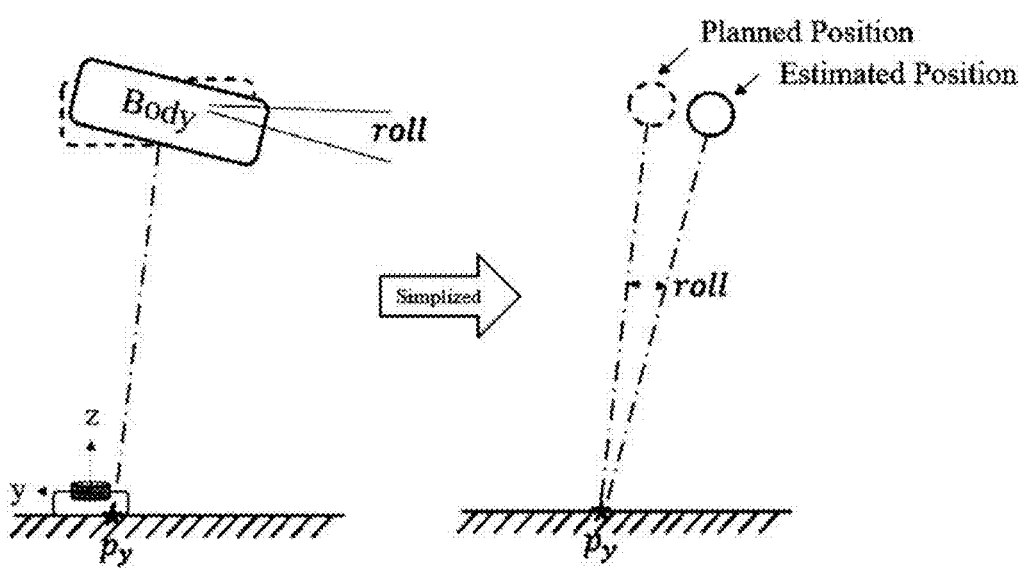
FIG. 7 is a schematic diagram of approximating a body posture error of the robot to a rotational angle of the linear inverted pendulum model around the ZMP of the legs of the robot.

In this embodiment, in order to estimate the state of the biped robot more accurately, a brand new LIPM with the ZMP of the legs of the robot as the supporting point is provided. FIG. 6 is a schematic diagram of the LIPM taking the ZMP of the legs of the robot as the supporting point according to an embodiment of the present disclosure. As shown in FIG. 6, according to this LIPM, in the supporting phase of the gait of the robot, the position of the supporting point of the LIPM will change with the change of the position of the ZMP of the legs of the robot. FIG. 7 is a schematic diagram of approximating a body posture error of the robot to a rotational angle of the LIPM around the ZMP of the legs of the robot. As shown in FIG. 7, after simplifying the biped robot to the LIPM with the ZMP of the legs of the robot as the supporting point, its body posture error (i.e., the error of the posture of the body of the robot) can be approximated as the rotational angle of the LIPM around the ZMP of the legs of the robot.

Figure 8:
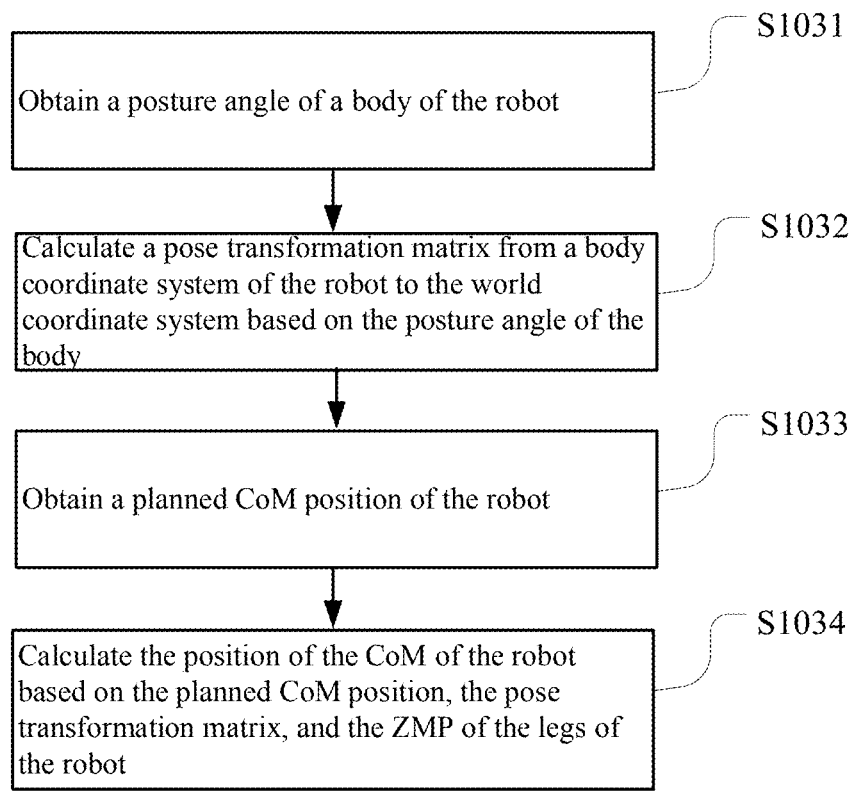
FIG. 8 is a flow chart of calculating a state of the robot based on the linear inverted pendulum model in the robot state estimation method of FIG. 1.

In this embodiment, the state of the robot may be estimated based on this new LIPM, which considers the influence of the change of the position of the ZMP of the legs of the robot and the change of the posture of the body can be considered comprehensively, thereby improving the accuracy of the estimation of the state of the biped robot. FIG. 8 is a flow chart of calculating a state of the robot based on the linear inverted pendulum model in the robot state estimation method of FIG. 1. As shown in FIG. 8, the estimation process may include the following steps.

S1031: obtaining a posture angle of a body of the robot.

As an example, the posture angle of the body may be obtained through an inertial measurement unit (IMU) installed on the body of the robot, which is denoted as Pose$_{body}$[3], and Pose$_{body}$[3]=[roll,pitch,yaw], where roll is the roll angle, pitch is the pitch angle, and yaw is the yaw angle.

S1032: calculating a pose transformation matrix from a body coordinate system of the robot to the world coordinate system based on the posture angle of the body.

The origin of the coordinate of the body coordinate system is the CoM of the robot, and the forward direction of the x-axis, the forward direction of the y-axis and the forward direction of z-axis are the forward direction, the leftward direction and the upward direction of the torso (i.e., the body) of the robot, respectively. The pose transformation matrix is denoted as $T_{body2world}$ which may be calculated using an equation of:

$$T_{body2world} = R_z(\text{yaw})R_y(\text{pitch})R_x(\text{roll});$$

where:

$$R_x(\text{roll}) = \begin{bmatrix} 1 & 0 & 0 \\ 0 & \cos(\text{roll}) & -\sin(\text{roll}) \\ 0 & \sin(\text{roll}) & \cos(\text{roll}) \end{bmatrix};$$

$$R_y(\text{pitch}) = \begin{bmatrix} \cos(\text{pitch}) & 0 & \sin(\text{pitch}) \\ 0 & 1 & 0 \\ -\sin(\text{pitch}) & 0 & \cos(\text{pitch}) \end{bmatrix}; \text{ and}$$

$$R_z(\text{yaw}) = \begin{bmatrix} \cos(\text{yaw}) & -\sin(\text{yaw}) & 0 \\ \sin(\text{yaw}) & \cos(\text{yaw}) & 0 \\ 0 & 0 & 1 \end{bmatrix}$$

S1033: obtaining a planned CoM position of the robot.

The planned CoM position may be set according to actual conditions. In this embodiment, the planned CoM position is denoted as $Com_{plan}[3]$, and $Com_{plan}[3]=[x_d, y_d, z_d]$, where $x_d, y_d, z_d$ are the coordinates of the planned CoM position on the x, y and z axes of the body coordinate system, respectively.

S1034: calculating the position of the CoM of the robot based on the planned COM position, the pose transformation matrix, and the ZMP of the legs of the robot.

As an example, the position of the CoM of the robot may be calculated using an equation of:

$$Com_{measure}[3]=P[3]+T_{body2world}*(Com_{plan}[3]-P[3]);$$

where, $Com_{measure}[3]$ is the position of the CoM of the robot and $Com_{measure}[3]=[x_m, y_m, z_m]$, where $x_m, y_m, z_m$ are the coordinates of the position of the CoM in the world on the x, y and z axes of the world coordinate system.

Furthermore, in this embodiment, the velocity of the CoM of the robot may be obtained by performing position differentiating calculation on a first CoM position and a second CoM position. In which, the first CoM position is the position of the CoM of the robot at a current moment, and the second CoM position is the position of the CoM of the robot at a previous moment As an example, the velocity of the CoM may be calculated using an equation of:

$$Vel_{measure}[3]=(Com_{measure}[3]_{now}-Com_{measure}[3]_{last})/t;$$

where, $Com_{measure}[3]$ is the first CoM position, $Com_{measure}[3]_{last}$ is the second CoM position, t is the time interval between two estimations of CoM positions, and $Vel_{measure}[3]_{now}$ is the velocity of the CoM. Considering the influence of the sensor noise, the velocity of the CoM obtained by differentiating calculation can be further filtered to obtain a more accurate velocity of the CoM.

In summary, in this embodiment, by obtaining the force information of the left leg of the robot and the right leg of the robot; calculating the ZMP of the legs of the robot in a world coordinate system based on the force information of the left leg and the force information of the right leg; calculating the position of the CoM of the robot based on the preset linear inverted pendulum model, a brand-new linear inverted pendulum model is constructed in advance, which uses the ZMP of the legs of the robot as a supporting point of the model, thereby fully considering the influence of the change of the position of the ZMP of the legs of the robot on the position of the CoM. Based on this model, more accurate estimation results can be obtained.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 9:
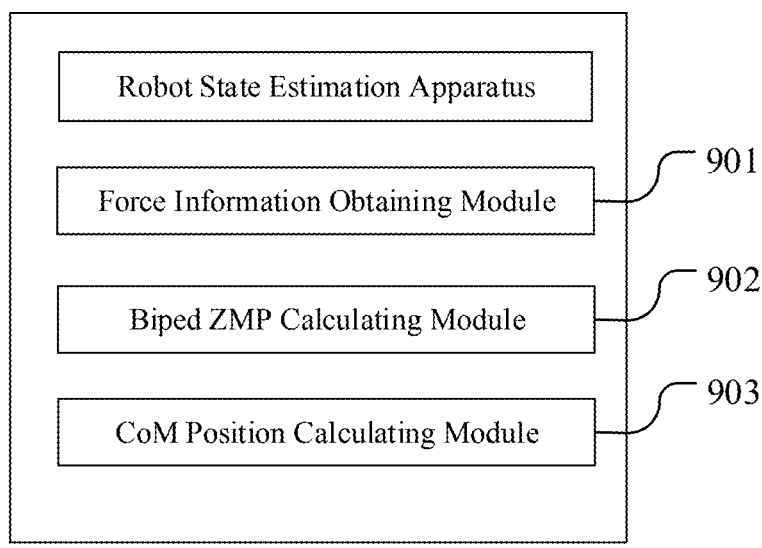
FIG. 9 is a schematic block diagram of the structure of a robot state estimation apparatus according to an embodiment of the present disclosure.

FIG. 9 is a schematic block diagram of the structure of a robot state estimation apparatus according to an embodiment of the present disclosure. As shown in FIG. 9, a state estimation apparatus for the above-mentioned biped robot that corresponds to the robot state estimation method described in the above-mentioned embodiments is provided. In this embodiment, the robot state estimation apparatus may include:

a force information obtaining module 901 configured to obtain force information of the left leg of the robot and the right leg of the robot;

a biped ZMP calculating module 902 configured to calculate a ZMP of the legs of the robot in a world coordinate system based on the force information of the left leg and the force information of the right leg; and a COM position calculating module 903 configured to calculate a position of a CoM of the robot based on a preset linear inverted pendulum model, where a supporting point of the linear inverted pendulum model is the ZMP of the legs of the robot.

Furthermore, the CoM position calculating module 903 may include:

a body posture angle obtaining sub-module configured to obtain a posture angle of a body of the robot;

a pose transformation matrix calculating sub-module configured to calculate a pose transformation matrix from a body coordinate system of the robot to the world coordinate system based on the posture angle of the body;

a CoM planning position obtaining sub-module configured to obtain a planned position of the CoM of the robot; and a COM position calculating sub-module configured to calculate the position of the COM of the robot based on the planned COM position, the pose transformation matrix, and the ZMP of the legs of the robot.

Furthermore, the biped ZMP calculating module 902 may include:

a left leg ZMP calculating sub-module configured to calculate the ZMP of the left leg of the robot based on the force information of the left leg;

a right leg ZMP calculating sub-module configured to calculate the ZMP of the right leg of the robot based on the force information of the right leg;

a position obtaining sub-module configured to obtain a first position and a second position, where the first position is a position of an origin of a six-dimensional force coordinate system of the left leg of the robot in the world coordinate system, and the second position is a position of an origin of a six-dimensional force coordinate system of the right leg of the robot in the world coordinate system; and a biped ZMP calculating sub-module configured to calculate the ZMP of the legs of the robot based on the first position, the second position, the ZMP of the left leg, and the ZMP of the right leg.

Furthermore, the robot state estimation apparatus may further include:

a CoM velocity calculating module configured to obtain a velocity of the CoM of the robot by performing position differentiating calculation on a first CoM position and a second CoM position, where the first CoM position is the position of the CoM of the robot at a current moment, and the second CoM position is the position of the CoM of the robot at a previous moment.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 10:
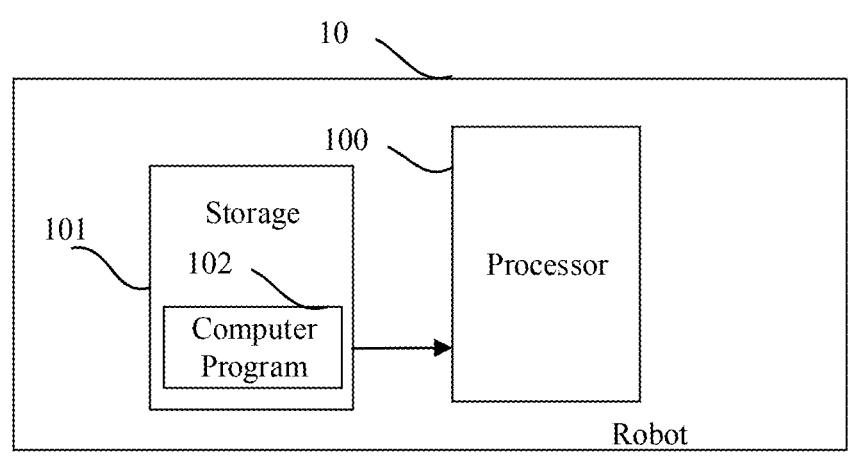
FIG. 10 is a schematic block diagram of a robot according to an embodiment of the present disclosure.

FIG. 10 is a schematic block diagram of a robot according to an embodiment of the present disclosure. For convenience of description, only parts related to this embodiment are shown. As shown in FIG. 10, in this embodiment, the robot 10 includes a processor 100, a storage 101, and a computer program 102 stored in the storage 101 and executable on the processor 100. When executing (instructions in) the computer program 102, the processor 100 implements the steps in the above-mentioned embodiments of the robot state estimation method, for example, steps S101-S103 shown in FIG. 1. Alternatively, when the processor 100 executes the (instructions in) computer program 102, the functions of each module/unit in the above-mentioned device embodiments, for example, the functions of the modules 901-903 shown in FIG. 9 are implemented.

Exemplarily, the computer program 102 may be divided into one or more modules/units, and the one or more modules/units are stored in the storage 101 and executed by the processor 100 to realize the present disclosure. The one or more modules/units may be a series of computer program instruction sections capable of performing a specific function, and the instruction sections are for describing the execution process of the computer program 102 in the robot 10.

It can be understood by those skilled in the art that FIG. 10 is merely an example of the robot 10 and does not constitute a limitation on the robot 10, and may include more or fewer components than those shown in the figure, or a combination of some components or different components. For example, the robot 10 may further include an input/output device, a network access device, a bus, and the like.

The processor 100 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 101 may be an internal storage unit of the robot 10, for example, a hard disk or a memory of the robot 10. The storage 101 may also be an external storage device of the robot 10, for example, a plug-in hard disk, a smart media card (SMC), a secure digital (SD) card, flash card, and the like, which is equipped on the robot 10. Furthermore, the storage 101 may further include both an internal storage unit and an external storage device, of the robot 10. The storage 101 is configured to store the computer program 102 and other programs and data required by the robot 10. The storage 101 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented robot state estimation method, comprising:
    providing a legged robot having a processor, a body, sensors, a left leg and a right leg, wherein the sensors are installed at parts where two feet of the robot and the legs of the robot are connected;
    obtaining, through the sensors, force information of the left leg and force information of the right leg;
    calculating, through the processor, a zero-moment point (ZMP) of the legs of the robot in a world coordinate system based on the force information of the left leg and the force information of the right leg;
    obtaining, through the processor, a posture angle of the body of the robot and a planned center of mass (COM) position of the robot;
    calculating, through the processor, a position of a CoM of the robot based on the planned COM position, the posture angle of the body, and the ZMP of the legs; and
    controlling, through the processor, motions of the robot, based on the position of the COM of the robot.

2. The method of claim 1, wherein the calculating the position of the CoM of the robot based on the planned COM position, the posture angle of the body, and the ZMP of the legs comprises:
    calculating a pose transformation matrix from a body coordinate system of the robot to the world coordinate system based on the posture angle of the body; and
    calculating the position of the CoM of the robot based on the planned COM position, the pose transformation matrix, and the ZMP of the legs.

3. The method of claim 2, wherein the calculating the position of the COM of the robot based on the planned COM position, the pose transformation matrix, and the ZMP of the legs comprises:
    calculating the position of the CoM of the robot using an equation of:

$$Com_{measure}[3]=P[3]+T_{body2world}*(Com_{plan}[3]-P[3]);$$

where, $Com_{plan}[3]$ is the planned COM position, $T_{body2world}$ is the pose transformation matrix, $P[3]$ is the ZMP of the legs, and $Com_{measure}[3]$ is the position of the CoM of the robot.

4. The method of claim 1, wherein the calculating the ZMP of the legs of the robot in the world coordinate system based on the force information of the left leg and the force information of the right leg comprises:
    calculating the ZMP of the left leg of the robot based on the force information of the left leg;
    calculating the ZMP of the right leg of the robot based on the force information of the right leg;
    obtaining a first position and a second position, wherein the first position is a position of an origin of a six-dimensional force coordinate system of the left leg of the robot in the world coordinate system, and the second position is a position of an origin of a six-dimensional force coordinate system of the right leg of the robot in the world coordinate system; and
    calculating the ZMP of the legs based on the first position, the second position, the ZMP of the left leg, and the ZMP of the right leg.

5. The method of claim 4, wherein the calculating the ZMP of the left leg of the robot based on the force information of the left leg comprises:
    calculating the ZMP of the left leg using an equation of:

$$p_{lx} = \frac{(-T_{lx} - F_{lx} * d_l)}{F_{lz}};$$

$$p_{ly} = \frac{(-T_{ly} - F_{ly} * d_l)}{F_{lz}}; \text{ and}$$

$$p_l = [p_{lx}, p_{ly}; 0];$$

where, $p_{lx}$ is the coordinate of the ZMP of the left leg on the x-axis of the six-dimensional force coordinate system of the left leg, and $p_{ly}$ is the coordinate of the ZMP of the left leg point on the y-axis of the six-dimensional force coordinate system of the left leg, $F_{lx}$ is a force component of the force information of the left leg on the x-axis of the six-dimensional force coordinate system of the left leg, $F_{ly}$ is a force component of the force information of the left leg on the y-axis of the six-dimensional force coordinate system of the left leg, $F_{lz}$ is a force component of the force information of the left leg on the z-axis of the six-dimensional force coordinate system of the left leg, $T_{lx}$ is a moment component of the force information of the left leg on the x-axis of the six-dimensional force coordinate system of the left leg, $T_{ly}$ is a moment component of the force information of the left leg on the y-axis of the six-dimensional force coordinate system of the left leg, $d_l$ is a height between the six-dimensional force sensor of the left leg and a ground, and $p_l$ is the ZMP of the left leg;

the calculating the ZMP of the right leg of the robot based on the force information of the right leg comprises:

calculating the ZMP of the right leg using an equation of:

$$p_{rx} = \frac{(-T_{rx} - F_{rx} * d_r)}{F_{rz}};$$

$$p_{ry} = \frac{(-T_{ry} - F_{ry} * d_r)}{F_{rz}}; \text{ and}$$

$$p_r = [p_{rx}, p_{ry}, 0];$$

where, $p_{rx}$ is the coordinate of the ZMP of the right leg on the x-axis of the six-dimensional force coordinate system of the right leg, and $p_{ry}$ is the coordinate of the ZMP of the right leg on the y-axis of the six-dimensional force coordinate system of the right leg, $F_{rx}$ is a force component of the force information of the right leg on the x-axis of the six-dimensional force coordinate system of the right leg, $F_{ry}$ is a force component of the force information of the right leg on the y-axis of the six-dimensional force coordinate system of the right leg, $F_{rz}$ is a force component of the force information of the right leg on the z-axis of the six-dimensional force coordinate system of the right leg, and $T_{rx}$ is a moment component of the force information of the right leg on the x-axis of the six-dimensional force coordinate system of the right leg, $T_{ry}$ is a moment component of the force information of the right leg on the y-axis of the six-dimensional force coordinate system of the right leg, $d_r$ is a height between the six-dimensional force sensor of the right leg and a ground, and $p_r$ is the ZMP of the right leg.

6. The method of claim 5, wherein the calculating the ZMP of the legs based on the first position, the second position, the ZMP of the left leg, and the ZMP of the right leg comprises:

calculating the ZMP of the legs using an equation of:

$$p_x = \frac{(p_{lx} + lfoot_x) * F_{lz} + (p_{rx} + rfoot_x) * F_{rz}}{F_{lz} + F_{rz}};$$

$$p_y = \frac{(p_{ly} + lfoot_y) * F_{lz} + (p_{ry} + rfoot_y) * F_{rz}}{F_{lz} + F_{rz}}; \text{ and}$$

$$P[3] = [p_x, p_y, 0];$$

where, [$lfoot_x$,$lfoot_y$,$lfoot_z$] is the first position, [$rfoot_x$, $rfoot_y$,$rfoot_z$] is the second position, $p_x$ is the coordinates of the ZMP of the legs on the x-axis of the world coordinate system, $p_y$ is the coordinate of the ZMP of the legs on the y-axis of the world coordinate system, and P[3] is the ZMP of the legs.

7. The method of claim 1, wherein after calculating the position of the CoM of the robot based on the planned position of the CoM, the posture angle of the body, and the ZMP of the legs, the method further comprises:

obtaining a velocity of the CoM of the robot by performing position differentiating calculation on a first COM position and a second COM position, wherein the first COM position is the position of the CoM of the robot at a current moment, and the second COM position is the position of the CoM of the robot at a previous moment.

8. A non-transitory computer-readable storage medium for storing one or more computer programs, wherein the one or more computer programs comprise:

instructions for obtaining force information of a left leg of a robot and force information of a right leg of the robot by using sensors installed at parts where two feet of the robot and the legs of the robot are connected;

instructions for calculating a zero-moment point (ZMP) of the legs of the robot in a world coordinate system based on the force information of the left leg and the force information of the right leg;

instructions for obtaining a posture angle of a body of the robot and a planned center of mass (COM) position of the robot;

instructions for calculating a position of a CoM of the robot based on the planned COM position, the posture angle of the body, and the ZMP of the legs; and instructions for controlling motions of the robot, based on the position of the CoM of the robot.

9. The storage medium of claim 8, wherein the instructions for calculating the position of the CoM of the robot based on the planned COM position, the posture angle of the body, and the ZMP of the legs comprise:

instructions for calculating a pose transformation matrix from a body coordinate system of the robot to the world coordinate system based on the posture angle of the body; and instructions for calculating the position of the CoM of the robot based on the planned COM position, the pose transformation matrix, and the ZMP of the legs.

10. The storage medium of claim 9, wherein the instructions for calculating the position of the CoM of the robot based on the planned COM position, the pose transformation matrix, and the ZMP of the legs comprise:

calculating the position of the CoM of the robot using an equation of:

$$Com_{measure}[3] = P[3] + T_{body2world} * (Com_{plan}[3] - P[3]);$$

where, $Com_{plan}[3]$ is the planned COM position, $T_{body2world}$ is the pose transformation matrix, P[3] is the ZMP of the legs, and $Com_{measure}[3]$ is the position of the CoM of the robot.

11. The storage medium of claim 8, wherein the instructions for calculating the ZMP of the legs of the robot in the world coordinate system based on the force information of the left leg and the force information of the right leg comprise:

instructions for calculating the ZMP of the left leg of the robot based on the force information of the left leg;

instructions for calculating the ZMP of the right leg of the robot based on the force information of the right leg;

instructions for obtaining a first position and a second position, wherein the first position is a position of an origin of a six-dimensional force coordinate system of the left leg of the robot in the world coordinate system, and the second position is a position of an origin of a six-dimensional force coordinate system of the right leg of the robot in the world coordinate system; and instructions for calculating the ZMP of the legs based on the first position, the second position, the ZMP of the left leg, and the ZMP of the right leg.

12. The storage medium of claim 11, wherein the instructions for calculating the ZMP of the left leg of the robot based on the force information of the left leg comprise:

instructions for calculating the ZMP of the left leg using an equation of:

$$p_{lx} = \frac{(-T_{lx} - F_{lx} * d_l)}{F_{lz}};$$

$$p_{ly} = \frac{(-T_{ly} - F_{ly} * d_l)}{F_{lz}}; \text{ and}$$

$$p_l = [p_{lx}, p_{ly}, 0];$$

where, $p_{lx}$ is the coordinate of the ZMP of the left leg on the x-axis of the six-dimensional force coordinate system of the left leg, and $p_{ly}$ is the coordinate of the ZMP of the left leg point on the y-axis of the six-dimensional force coordinate system of the left leg, $F_{lx}$ is a force component of the force information of the left leg on the x-axis of the six-dimensional force coordinate system of the left leg, $F_{ly}$ is a force component of the force information of the left leg on the y-axis of the six-dimensional force coordinate system of the left leg, $F_{lz}$ is a force component of the force information of the left leg on the z-axis of the six-dimensional force coordinate system of the left leg, $T_{lx}$ is a moment component of the force information of the left leg on the x-axis of the six-dimensional force coordinate system of the left leg, $T_{ly}$ is a moment component of the force information of the left leg on the y-axis of the six-dimensional force coordinate system of the left leg, $d_l$ is a height between the six-dimensional force sensor of the left leg and a ground, and $p_l$ is the ZMP of the left leg;

the instructions for calculating the ZMP of the right leg of the robot based on the force information of the right leg comprise:

instructions for calculating the ZMP of the right leg using an equation of:

$$p_{rx} = \frac{(-T_{rx} - F_{rx} * d_r)}{F_{rz}};$$

$$p_{ry} = \frac{(-T_{ry} - F_{ry} * d_r)}{F_{rz}}; \text{ and}$$

$$p_r = [p_{rx}, p_{ry}, 0];$$

where, $p_{rx}$ is the coordinate of the ZMP of the right leg on the x-axis of the six-dimensional force coordinate system of the right leg, and $p_{ry}$ is the coordinate of the ZMP of the right leg on the y-axis of the six-dimensional force coordinate system of the right leg, $F_{rx}$ is a force component of the force information of the right leg on the x-axis of the six-dimensional force coordinate system of the right leg, $F_{ry}$ is a force component of the force information of the right leg on the y-axis of the six-dimensional force coordinate system of the right leg, $F_{rz}$ is a force component of the force information of the right leg on the z-axis of the six-dimensional force coordinate system of the right leg, and $T_{rx}$ is a moment component of the force information of the right leg on the x-axis of the six-dimensional force coordinate system of the right leg, $T_{ry}$ is a moment component of the force information of the right leg on the y-axis of the six-dimensional force coordinate system of the right leg, $d_r$ is a height between the six-dimensional force sensor of the right leg and a ground, and $p_r$ is the ZMP of the right leg.

13. The storage medium of claim 12, wherein the instructions for calculating the ZMP of the legs based on the first position, the second position, the ZMP of the left leg, and the ZMP of the right leg comprise:

instructions for calculating the ZMP of the legs using an equation of:

$$p_x = \frac{(p_{lx} + lfoot_x) * F_{lz} + (p_{rx} + rfoot_x) * F_{rz}}{F_{lz} + F_{rz}};$$

$$p_y = \frac{(p_{ly} + lfoot_y) * F_{lz} + (p_{ry} + rfoot_y) * F_{rz}}{F_{lz} + F_{rz}};$$

and $$P[3]=[p_x,p_y,0];$$

where, $[lfoot_x, lfoot_y, lfoot_z]$ is the first position, $[rfoot_x, rfoot_y, rfoot_z]$ is the second position, $p_x$ is the coordinates of the ZMP of the legs on the x-axis of the world coordinate system, $p_y$ is the coordinate of the ZMP of the legs on the y-axis of the world coordinate system, and $P[3]$ is the ZMP of the legs.

14. A legged robot, comprising:
a left leg;
a right leg;
a processor;
sensors installed at parts where two feet of the robot and the legs of the robot are connected;
a memory coupled to the processor; and
one or more computer programs stored in the memory and executable on the processor;
wherein, the one or more computer programs comprise:
instructions for obtaining, through the sensors, force information of the left leg and force information of the right leg;
instructions for calculating a zero-moment point (ZMP) of the legs of the robot in a world coordinate system based on the force information of the left leg and the force information of the right leg;
instructions for obtaining a posture angle of a body of the robot and a planned center of mass (COM) position of the robot;
instructions for calculating a position of a CoM of the robot based on the planned COM position, the posture angle of the body, and the ZMP of the legs; and
instructions for controlling motions of the robot, based on the position of the CoM of the robot.

15. The robot of claim 14, wherein the instructions for calculating the position of the COM of the robot based on the planned COM position, the posture angle of the body, and the ZMP of the legs comprise:
instructions for calculating a pose transformation matrix from a body coordinate system of the robot to the world coordinate system based on the posture angle of the body; and
instructions for calculating the position of the CoM of the robot based on the planned COM position, the pose transformation matrix, and the ZMP of the legs.

16. The robot of claim 15, wherein the instructions for calculating the position of the COM of the robot based on the planned COM position, the pose transformation matrix, and the ZMP of the legs comprise:
calculating the position of the CoM of the robot using an equation of:

$$Com_{measure}[3]=P[3]+T_{body2world}*(Com_{plan}[3]-P[3]);$$

where, $\text{Com}_{plan}[3]$ is the planned COM position, $T_{body2world}$ is the pose transformation matrix, P[3] is the ZMP of the legs, and $\text{Com}_{measure}[3]$ is the position of the CoM of the robot.

17. The robot of claim 14, wherein the instructions for calculating the ZMP of the legs of the robot in the world coordinate system based on the force information of the left leg and the force information of the right leg comprise:
   instructions for calculating the ZMP of the left leg of the robot based on the force information of the left leg;
   instructions for calculating the ZMP of the right leg of the robot based on the force information of the right leg;
   instructions for obtaining a first position and a second position, wherein the first position is a position of an origin of a six-dimensional force coordinate system of the left leg of the robot in the world coordinate system, and the second position is a position of an origin of a six-dimensional force coordinate system of the right leg of the robot in the world coordinate system; and
   instructions for calculating the ZMP of the legs based on the first position, the second position, the ZMP of the left leg, and the ZMP of the right leg.

18. The robot of claim 17, wherein the instructions for calculating the ZMP of the left leg of the robot based on the force information of the left leg comprise:
   instructions for calculating the ZMP of the left leg using an equation of:

$$p_{lx} = \frac{(-T_{lx} - F_{lx} * d_l)}{F_{lz}};$$

$$p_{ly} = \frac{(-T_{ly} - F_{ly} * d_l)}{F_{lz}}; \text{ and}$$

$$p_l = [p_{lx}, p_{ly}, 0];$$

where, $p_{lx}$ is the coordinate of the ZMP of the left leg on the x-axis of the six-dimensional force coordinate system of the left leg, and $p_{ly}$ is the coordinate of the ZMP of the left leg point on the y-axis of the six-dimensional force coordinate system of the left leg, $F_{lx}$ is a force component of the force information of the left leg on the x-axis of the six-dimensional force coordinate system of the left leg, $F_{ly}$ is a force component of the force information of the left leg on the y-axis of the six-dimensional force coordinate system of the left leg, $F_{lz}$ is a force component of the force information of the left leg on the z-axis of the six-dimensional force coordinate system of the left leg, $T_{lx}$ is a moment component of the force information of the left leg on the x-axis of the six-dimensional force coordinate system of the left leg, $T_{ly}$ is a moment component of the force information of the left leg on the y-axis of the six-dimensional force coordinate system of the left leg, $d_l$ is a height between the six-dimensional force sensor of the left leg and a ground, and $p_l$ is the ZMP of the left leg;
   the instructions for calculating the ZMP of the right leg of the robot based on the force information of the right leg comprise:
   instructions for calculating the ZMP of the right leg using an equation of:

$$p_{rx} = \frac{(-T_{rx} - F_{rx} * d_r)}{F_{rz}};$$

$$p_{ry} = \frac{(-T_{ry} - F_{ry} * d_r)}{F_{rz}}; \text{ and}$$

$$p_r = [p_{rx}, p_{ry}, 0];$$

where, $p_{rx}$ is the coordinate of the ZMP of the right leg on the x-axis of the six-dimensional force coordinate system of the right leg, and $p_{ry}$ is the coordinate of the ZMP of the right leg on the y-axis of the six-dimensional force coordinate system of the right leg, $F_{rx}$ is a force component of the force information of the right leg on the x-axis of the six-dimensional force coordinate system of the right leg, $F_{ry}$ is a force component of the force information of the right leg on the y-axis of the six-dimensional force coordinate system of the right leg, $F_{rz}$ is a force component of the force information of the right leg on the z-axis of the six-dimensional force coordinate system of the right leg, and $T_{rx}$ is a moment component of the force information of the right leg on the x-axis of the six-dimensional force coordinate system of the right leg, $T_{ry}$ is a moment component of the force information of the right leg on the y-axis of the six-dimensional force coordinate system of the right leg, $d_r$ is a height between the six-dimensional force sensor of the right leg and a ground, and $p_r$ is the ZMP of the right leg.

19. The robot of claim 18, wherein the instructions for calculating the ZMP of the legs based on the first position, the second position, the ZMP of the left leg, and the ZMP of the right leg comprise:
   instructions for calculating the ZMP of the legs using an equation of:

$$p_x = \frac{(p_{lx} + lfoot_x) * F_{lz} + (p_{rx} + rfoot_x) * F_{rz}}{F_{lz} + F_{rz}};$$

$$p_y = \frac{(p_{ly} + lfoot_y) * F_{lz} + (p_{ry} + rfoot_y) * F_{rz}}{F_{lz} + F_{rz}}; \text{ and}$$

$$P[3] = [p_x, p_y, 0];$$

where, $[lfoot_x, lfoot_y, lfoot_z]$ is the first position, $[rfoot_x, rfoot_y, rfoot_z]$ is the second position, $p_x$ is the coordinates of the ZMP of the legs on the x-axis of the world coordinate system, $p_y$ is the coordinate of the ZMP of the legs on the y-axis of the world coordinate system, and P[3] is the ZMP of the legs.

20. The robot of claim 14, wherein the one or more computer programs further comprises:
   instructions for obtaining a velocity of the CoM of the robot by performing position differentiating calculation on a first COM position and a second COM position, wherein the first COM position is the position of the CoM of the robot at a current moment, and the second COM position is the position of the CoM of the robot at a previous moment.

* * * * *